US008579252B2

(12) United States Patent
Heer

(10) Patent No.: US 8,579,252 B2
(45) Date of Patent: Nov. 12, 2013

(54) ACTUATOR DEVICE HAVING AN OPEN/CLOSE VALVE

(75) Inventor: Klaus-Peter Heer, Herxheim (DE)

(73) Assignee: Siemens Aktiengesellschaft, Munich (DE)

( * ) Notice: Subject to any disclaimer, the term of this patent is extended or adjusted under 35 U.S.C. 154(b) by 218 days.

(21) Appl. No.: 13/146,526

(22) PCT Filed: Jan. 21, 2010

(86) PCT No.: PCT/EP2010/050665
§ 371 (c)(1),
(2), (4) Date: Oct. 11, 2011

(87) PCT Pub. No.: WO2010/086271
PCT Pub. Date: Aug. 5, 2010

(65) Prior Publication Data
US 2012/0055329 A1    Mar. 8, 2012

(30) Foreign Application Priority Data
Jan. 28, 2009   (DE) .......................... 10 2009 006 533

(51) Int. Cl.
*F16K 31/02*   (2006.01)
(52) U.S. Cl.
USPC ................. 251/129.04; 251/73; 137/487.5; 73/168
(58) Field of Classification Search
USPC ................. 251/129.04, 73; 137/487.5; 73/168
See application file for complete search history.

(56) References Cited

U.S. PATENT DOCUMENTS

| 5,197,328 | A * | 3/1993 | Fitzgerald ...................... 73/168 |
| 8,074,512 | B2 * | 12/2011 | Al-Buaijan ..................... 73/168 |
| 8,262,060 | B2 * | 9/2012 | Heer et al. ............... 251/129.04 |
| 2004/0250861 | A1 | 12/2004 | Schnell et al. |
| 2006/0219299 | A1 | 10/2006 | Snowbarger |
| 2010/0089473 | A1 | 4/2010 | Grein et al. |
| 2010/0187456 | A1 | 7/2010 | Heer et al. |
| 2010/0315069 | A1 * | 12/2010 | Heer et al. ............... 324/207.11 |

FOREIGN PATENT DOCUMENTS

| GB | 2 332 939 | 7/1999 |
| GB | 2 346 672 | 8/2000 |
| JP | 60-31602 | 2/1985 |
| WO | WO 2008/135417 | 11/2008 |
| WO | WO 2008/138949 | 11/2008 |
| WO | WO 2009/013205 | 1/2009 |

* cited by examiner

*Primary Examiner* — Eric Keasel
*Assistant Examiner* — Ian Paquette
(74) *Attorney, Agent, or Firm* — Cozen O'Connor

(57) ABSTRACT

An arrangement in which a valve assembly is provided between the supply air inlet and the magnetic valve that is activated by a position threshold sensor that can be activated by the actuator element and/or a pressure threshold sensor registering the actuating pressure on the magnetic valve and connects the magnetic valve directly to the supply air to increase the availability of the actuator device when the position threshold sensor detects the attaining of a specified operation position of the actuator element or the pressure threshold sensor detects the failure to attain a specified minimum pressure.

13 Claims, 3 Drawing Sheets

ACTUATOR DEVICE HAVING AN OPEN/CLOSE VALVE

CROSS-REFERENCE TO RELATED APPLICATIONS

The present application is a U.S. national stage of application No. PCT/EP2010/050665 filed 21 Jan. 2010. Priority is claimed on German Application No. 10 2009 006 533.4 filed 28 Jan. 2009, the content of which is incorporated herein by reference in its entirety.

BACKGROUND OF THE INVENTION

1. Field of the Invention

The invention relates to an actuator device having an open/close valve which is adjustable by a pneumatic actuating drive and by an actuating element that acts on the open/close valve, a position sensor which records the actual position of the actuating element, and an electropneumatic position controller that is supplied with compressed air through a feed air inlet and generates an actuating pressure at an actuating pressure outlet as a function of the actual position and a setpoint position, where the actuating pressure is supplied to the actuating drive by an activated solenoid valve which, in order to be activated, is supplied with a supply voltage and, in an emergency, can be deactivated by switching off the supply voltage in order to vent the actuating drive.

Actuator devices are known from WO 2008/138949 A1, US 2006/0219299 A1 and/or WO 2008/135417 A1.

An open/close valve, i.e., an emergency shut-down (ESD) valve, is moved either to an operating position, for example "open", or a safety position, for example "closed", by a pneumatic actuating drive. A solenoid valve, which is activated with a supply voltage which is provided, for example, by a control system, connects the pneumatic drive to a compressed air supply. In an emergency, the supply voltage is switched off to vent the pneumatic drive by the solenoid valve, so that the open/close valve is moved from the operating position to the safety position.

In order to be able to check the ability of the actuator device to function as part of a partial stroke test, the compressed air is supplied by an electropneumatic position controller. During the partial stroke test, the open/close valve is moved from the operating position over part of its actuating path and then moved back again by the position controller. Here, the change in position is so slight that ongoing operation of the system in which the open/close valve is incorporated is disturbed only to an insignificant extent and does not have to be interrupted. The actuating movement is recorded and stored, or passed on to the control system during the partial stroke test.

In the device disclosed in WO 2008/138949 A1, a solenoid valve test signal is generated to test the solenoid valve, where the solenoid test signal is used to actuate a controllable switch for interrupting the voltage supply to the solenoid valve so that the solenoid valve is deactivated. As a result, the actuating drive is vented. The actuating element then moves as far as a prespecified position, where a limit value switch opening and the path of the solenoid valve test signal to the controllable switch is interrupted when the prespecified position is reached. The controllable switch therefore re-connects the voltage supply for the solenoid valve, where the solenoid valve is activated as a result, and re-establishes the pneumatic connection between the position controller and the actuating drive, and therefore the movement of the actuating element is stopped and reversed. This leads to an oscillating movement of the actuating element, where the oscillating movement lasts for as long as the solenoid valve test signal is generated and the oscillating movement is detected by the position controller and being passed on to the control system.

In the device described in US 2006/0219299 A1, for the purpose of testing the solenoid valve, a solenoid valve is briefly deactivated by interrupting the voltage supply to the solenoid valve and, in the process, the pressure difference between the side of the solenoid valve connected to the position controller and the side of the solenoid valve connected to the actuating drive is monitored. The testing of the solenoid valve is judged as being successful when, in the event of a brief deactivation of the solenoid valve, the pressure on the side of the actuating drive drops significantly, while the pressure provided by the position controller remains largely unchanged.

In the device described in WO 2008/135417 A1, a partial stroke test and a test of the solenoid valve are performed in a single test sequence by deactivating the solenoid valve, where the actuating movement of an actuating element is detected by a position controller and is monitored to determine when it reaches a prespecified path change and is re-activated when the solenoid valve reaches the prespecified path change.

Patent application PCT/EP2008/059316 proposes, for the purpose of reducing the technical outlay, connecting the electropneumatic position controller directly, i.e., without the interposition of a solenoid valve which can be controlled by the supply voltage, to the pneumatic actuating drive. Instead, the position controller is connected to the supply voltage on the power supply side and is designed to vent the actuating drive in the event of failure of the power supply. Amongst other things, a routine for performing the partial stroke test is stored in the position controller.

Therefore, in actuator devices having an open/close valve, the electropneumatic position controller allows a partial stroke test to be performed and assists the testing of the solenoid valve. The safety of the actuator device is in no way compromised by the provision of the position controller because, in the event of an emergency, the actuating drive is always vented by the solenoid valve, and therefore the open/close valve is moved to the safety position. However, the availability of the actuator device can be reduced by the presence of the position controller if, as a result of a disturbance in the position controller or the supply of electricity to the position controller, the compressed air supply to the solenoid valve fails and the open/close valve is moved to the safety position without there being an emergency.

SUMMARY OF THE INVENTION

It is therefore an object of the invention to provide an improved actuator device that solves the foregoing problem.

These and other objects and advantages are achieved in accordance with the invention, by providing an actuator device with a controllable valve arrangement between the feed air inlet of the position controller and the solenoid valve, where the valve arrangement is actuated by a position limit value sensor which is operable by the actuating element and/or a pressure limit value sensor which records the actuating pressure at the solenoid valve and connects the solenoid valve directly to the feed air when the position limit value sensor detects that a prespecified movement position of the actuating element has been reached or the pressure limit value sensor detects that a prespecified minimum pressure has been undershot.

Consequently, if a disturbance in the position controller causes said position controller to be vented, this disturbance is detected by a corresponding drop in the actuating pressure at the solenoid valve and/or by a corresponding movement of the actuating element out of an operating position. As a result, the controllable valve arrangement is actuated such that the solenoid valve is no longer supplied with feed air by the position controller but rather directly. The safety of the actuator device is in no way compromised as a result of this, because the actuating drive is still vented by the solenoid valve, and therefore the open/close valve is moved to the safety position in the event of an emergency.

The controllable valve arrangement preferably comprises a three-way valve situated between the feed air inlet, the actuating pressure outlet and the solenoid valve, where the three-way valve connects the solenoid valve either to the actuating pressure outlet of the position controller or directly to the feed air.

The pressure limit value sensor can directly mechanically actuate the valve arrangement. However, it is also possible for the pressure limit value sensor to electrically actuate the valve arrangement, similarly to the position limit value sensor. To this end, the valve arrangement can be electrically actuated and is connected to the supply voltage by the position or pressure limit value sensor which comprises a limit value switch. The limit value switch, which is open in the operating position of the actuating element or is open when there is a sufficiently high actuating pressure, closes when the actuating element reaches the prespecified movement position or the recorded actuating pressure falls below the prespecified minimum pressure. As a result, the supply voltage is connected-through to the valve arrangement which then connects the solenoid valve directly to the feed air. If the supply voltage fails, the valve arrangement remains deactivated, irrespective of the switching position of the limit value switch, and connects the solenoid valve to the actuating pressure outlet of the position controller.

As previously mentioned, a greater drop in the actuating pressure that is provided by the position controller for the solenoid valve leads to a changeover of the valve arrangement by the valve arrangement connecting the solenoid valve directly to the feed air. The pressure limit value sensor then records a higher pressure again and the actuating element again moves back to the operating position. Consequently, the valve arrangement is also switched back again and connects the solenoid valve to the actuating pressure outlet of the position controller. If the actuating pressure that is provided by the position controller for the solenoid valve is still too low, the valve arrangement is switched over again. This process is repeated for as long as the disturbance in the position controller lasts. This results in an oscillating movement of the actuating element, where the oscillating movement is preferably recorded by the position sensor of the position controller and is registered in the position controller and/or is signaled as a fault to the superordinate control system by the position controller. As an alternative or in addition, the periodic fluctuation of the actuating pressure can also be recorded by the pressure limit value sensor and registered in the position controller and/or signaled as a fault by the position controller.

If the position or pressure limit value sensor, as described above, comprises a limit value switch, the switching activity of the limit value switch in an auxiliary circuit (signaling circuit) can be recorded to detect the fault or the disturbance in the position controller.

In an actuator device, in which the electropneumatic position controller is directly connected to the pneumatic actuating drive without the intermediate connection of a solenoid value which can be controlled by the supply voltage, is connected at the power supply end to the supply voltage and is designed to vent the actuating drive if the power supply fails, the problem addressed by the present invention is achieved in an analogous manner in that a valve arrangement positioned between the feed air inlet of the position controller and the actuating drive, where it is possible for the valve arrangement to be electrically activated, the valve arrangement connects the actuating drive to the actuating pressure outlet in the passive state and directly to the feed air in the active state, and is actuated by a position limit value sensor which is operable by the actuating element and/or a pressure limit value sensor which records the actuating pressure at the solenoid valve. The limit value sensor comprises a limit value switch that connects the valve arrangement to the supply voltage and which closes when the actuating element reaches the prespecified movement position or the recorded actuating pressure falls below the prespecified minimum pressure.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In order to further explain the invention, reference is made to the figures in the drawing in the text which follows in which.

DETAILED DESCRIPTION OF THE PREFERRED EMBODIMENTS

Figure 1:
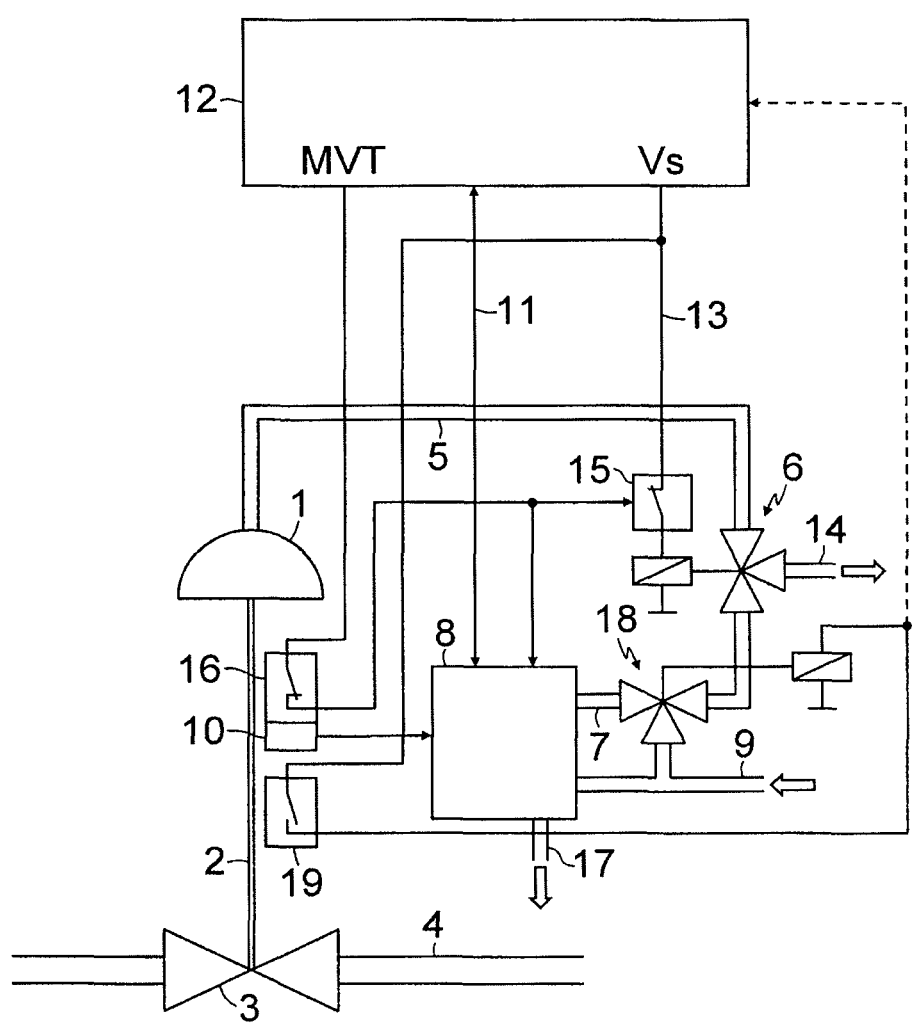
FIG. 1 shows an exemplary embodiment of the actuator device having a solenoid valve in accordance with the invention.

FIG. 1 shows an actuator device having a pneumatic actuating drive 1 which, by use of an actuating element 2, in this case comprising a lifting rod, operates an open/close valve 3 in a pipeline 4 through which a fluid flows. The open/close valve 3 has an operating position in which it is open or closed, and a safety position, which is provided if there is an emergency, in which it is closed or, respectively open. The actuating drive 1 is connected to the actuating pressure outlet 7 of a position controller 8, which is supplied with compressed air (feed air) at a feed air inlet 9, through a pneumatic line 5 with a solenoid valve 6 arranged therein. A position sensor 10 records the actual position of the actuating element 2 and supplies this actual position to the position controller 8 that sets a variable actuating pressure at its actuating pressure outlet 7 as a function of the actual position and a prespecifiable setpoint position, in order to move the actuating element 2 with the valve 3 to the setpoint position, for example 95% of the operating end position. In order to prespecify a setpoint position, the position controller 8 can be connected to a control system 12 by a communication line 11, such as a 4-20 mA line.

The solenoid valve 6 comprises a three-way valve and receives a supply voltage Vs from the control system 12 over a line 13.

In the normal case, the supply voltage Vs is switched on, and therefore the solenoid valve 6 is activated and pneumatically connects the actuating pressure outlet 7 of the position controller 8 to the actuating drive 1. In the event of an emergency, the control system 12 switches off the supply voltage Vs, and therefore the solenoid valve 6 that is then deactivated disconnects the actuating drive 1 from the position controller 8 and instead vents through a solenoid valve outlet 14. The actuating drive 1 is then at zero pressure and moves the actuating element 2 with the valve 3, for example, under the action of a spring in the actuating drive 1, to the safety position. The deactivation and subsequent re-activation of the solenoid valve 6 can additionally also be performed at the actuator device itself by a controllable switch 15 being opened and closed again over the course of the line 13.

In a partial stroke test that is automatically initiated at regular intervals by the control system 12, the open/close valve 4 is moved briefly out of the respective current position over part of its actuating path, and then moved back again, when the solenoid valve 6 is activated. Here, the change in position is so slight that ongoing operation of the system in which the valve 3 is incorporated is not disturbed or is disturbed only to an insignificant extent. In each test, the actual position reached by the actuating element 2 or the valve 3 is transmitted to the control system 12, for example, by the communication line 11, and stored and logged there. The partial stroke test is judged as being successful as a function of a prespecified change in position being reached within a minimum time or the change in position reaching a minimum value within a prespecified time. In this way, it is possible to determine when the valve 3 is blocked or reacts too slowly.

After each or each n-th partial stroke test, the ability of the solenoid valve 6 to function is tested, where the solenoid valve is deactivated for this purpose. To this end, the control system 12 generates a solenoid valve test signal MVT with which the controllable switch 15 is opened. The solenoid valve test signal MVT is supplied to the controllable switch 15 by a limit value switch 16 that is closed in the operating position of the actuating element 2 and is opened in a prespecified position of the actuating element 2. The prespecified position is reached in the event of a small movement of the actuating element 2 of, for example, 10 to 20% of the actuating path from the operating position. In response to the solenoid valve test signal MVT that is generated by the control system 12, the controllable switch 15 interrupts the voltage supply to the solenoid valve 6, so that the solenoid valve is deactivated and, as a result, the actuating drive 1 is vented. The actuating element 2 then moves as far as the prespecified position in which the limit value switch 16 is open and the path of the solenoid valve test signal MVT to the controllable switch 15 is interrupted. The controllable switch 15 therefore re-connects the voltage supply for the solenoid valve 6, where the solenoid valve is activated as a result and re-establishes the pneumatic connection between the position controller 8 and the actuating drive 1, and therefore the movement of the actuating element 2 is stopped and reversed. This leads to the limit value switch 16 being re-closed and the solenoid valve test signal MVT that is produced being connected-through to the controllable switch 15 again, and therefore the limit value switch 16 is opened, where the solenoid valve 6 is deactivated and the actuating element 2 is again moved to the prespecified position. This process is repeated for as long as the control system 12 generates the solenoid valve test signal MVT, and therefore the actuating element 2 oscillates about the prespecified position. Here, the position that is recorded by the position sensor 10 in this case is transmitted to the control system 12 by the position controller 8 and stored there for logging purposes.

Figure 2:
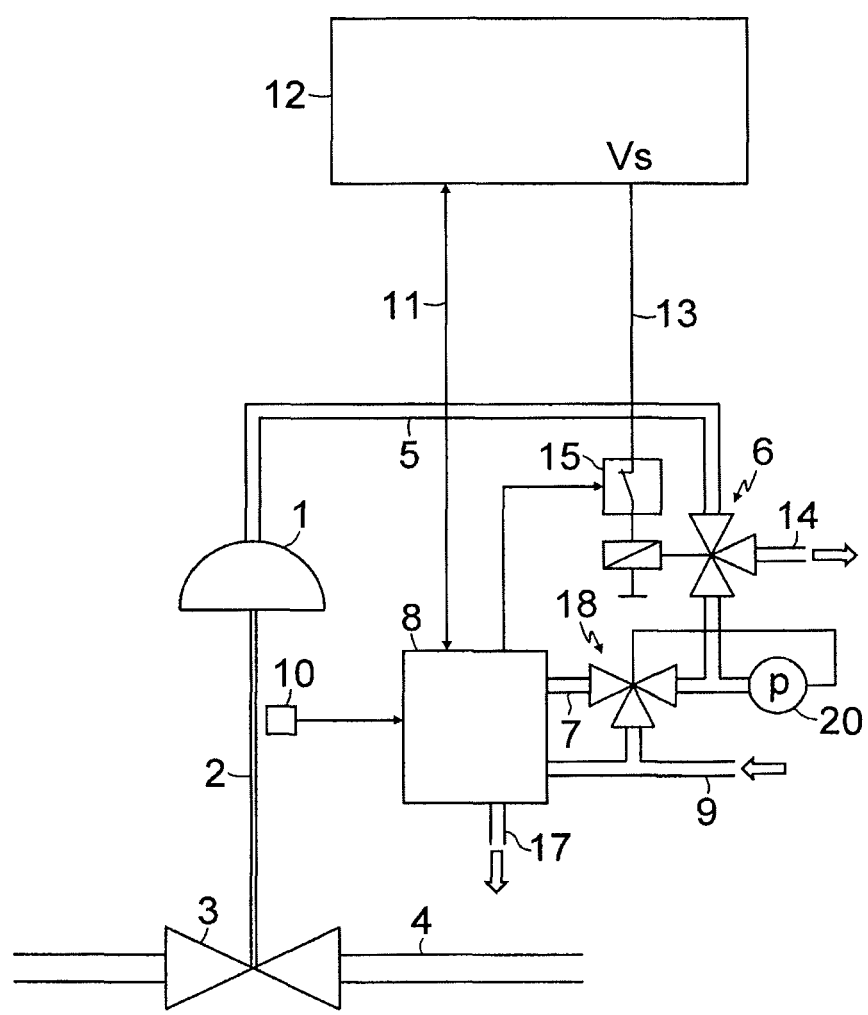
FIG. 2 shows an alternative exemplary embodiment of the actuator device in accordance with the invention.

In the actuator device shown in FIG. 2, the partial stroke test and the testing of the solenoid valve 6 are performed in a single test sequence, for which purpose the control system 12 automatically outputs a corresponding command to the position controller 8 over the communication line 11. The position controller then generates a control signal for opening the controllable switch 15, and therefore the solenoid valve 6 is deactivated and, as a result of this deactivation, the actuating drive 1 is vented. The movement of the actuating element 2 which begins as a result is recorded by the position sensor 10 and supplied to the position controller 8. Said position controller monitors the actuating movement of the actuating element 2 for when it reaches a prespecified parameterizable path change and, when this prespecified path change is achieved, generates a control signal for closing the controllable switch 15, so that the solenoid valve 6 is re-activated and the pneumatic connection between the position controller 8 and the actuating drive 1 is re-established. The position controller 8 now returns the actuating element 2 with the valve 3 back to the operating position before the test, with the actuating movement also being recorded. The position controller 8 transmits the test results to the control system 12 for further processing and analysis.

A disturbance in the position controller 8, for example, in the event of a failure of the power supply to the position controller, may lead to said position controller being vented via an outlet 17, so that the actuating pressure at the actuating pressure outlet 7 drops. As a result, the supply of compressed air to the actuating drive 1 fails and the open/close valve 3 is moved to the safety position without there being an emergency. In order to prevent this, a controllable valve arrangement 18 is situated between the feed air inlet 9 of the position controller 8 and the solenoid valve 6, where the valve arrangement connects the solenoid valve 6 directly to the feed air and thus maintains the supply of compressed air to the actuating drive 1 in the event of the described fault in the position controller 8. The controllable valve arrangement 18 comprises a three-way valve which is situated between the feed air inlet 9, the actuating pressure outlet 7 and the solenoid valve 6 and which connects the solenoid valve 6 either to the actuating pressure outlet 7 of the position controller 8 or directly to the feed air.

In the actuator device shown in FIG. 1, the valve arrangement 18 comprises a three-way solenoid valve that is connected to the supply voltage Vs by a position limit value sensor 19 that is operable by the actuating element 2 and comprises a limit value switch. The limit value switch 19 is open in the operating position of the valve 3, and therefore the three-way solenoid valve 18 is deactivated and connects the solenoid valve 6 to the actuating pressure outlet 7 of the position controller 8. If, on account of a disturbance in the position controller 8, the position controller vents the actuating drive 1 through the outlet 17 and, as a result of this, the actuating element 2 reaches a prespecified movement position of, for example, 95% of the operating end position, the limit value switch 19 closes, with the three-way solenoid valve 18 which is then activated connecting the solenoid valve 6 to the feed air. As a result, the movement of the actuating element 2 is stopped and reversed in the direction of the operating end position, and therefore the limit value switch 19 re-closes and the three-way solenoid valve 18 that is activated as a result again connects the solenoid valve 6 to the actuating pressure outlet of the position controller 8. Therefore, the actuating element 2 performs an oscillating movement for the period for which there is no compressed air supply to the actuating drive by the position controller 8, it being possible for the oscillating movement to be detected by the position controller 8 and signaled to the control system 12 by the communication line 11. This signal can also be output, for example, by an auxiliary contact (not shown) of the limit value switch 19 in an auxiliary circuit that leads to the control system 12, or, for example, the current in the connecting path from the supply voltage Vs to the limit value switch 19 or, as indicated by a dashed line, the electrical voltage across the valve arrangement 18 is recorded.

If the supply voltage Vs fails or is switched off by the control system 12 in response to an emergency, the three-way solenoid valve 18 remains deactivated and the solenoid valve 6 vents the actuating drive 1.

In the actuator device shown in FIG. 2, the valve arrangement 18 is mechanically actuated by a pressure limit value sensor 20 that records the actuating pressure at the solenoid valve 6, with the valve arrangement 18 connecting the solenoid valve to the feed air if the pressure limit value sensor 20 detects that a prespecified minimum pressure has been undershot. In this case, the actuating element 2 also performs an oscillating movement for the period for which there is no compressed air supply to the solenoid valve 6 by the position controller 8, where it is possible for the oscillating movement to be detected by the position controller 8 and signaled to the control system 12. As an alternative, the signal can be output by an auxiliary contact (not shown) of the pressure limit value sensor 20 in an auxiliary circuit that leads to the control system 12.

Analogously to the limit value switch 19 in FIG. 1, the pressure limit value sensor 20 can likewise comprise a limit value switch that opens when the recorded actuating pressure falls below the prespecified minimum pressure.

The valve arrangements 18 with the position limit value sensor 19 or pressure limit value sensor 20 shown in FIGS. 1 and 2 can be exchanged for one another or can be provided together, so as to supplement one another.

Figure 3:
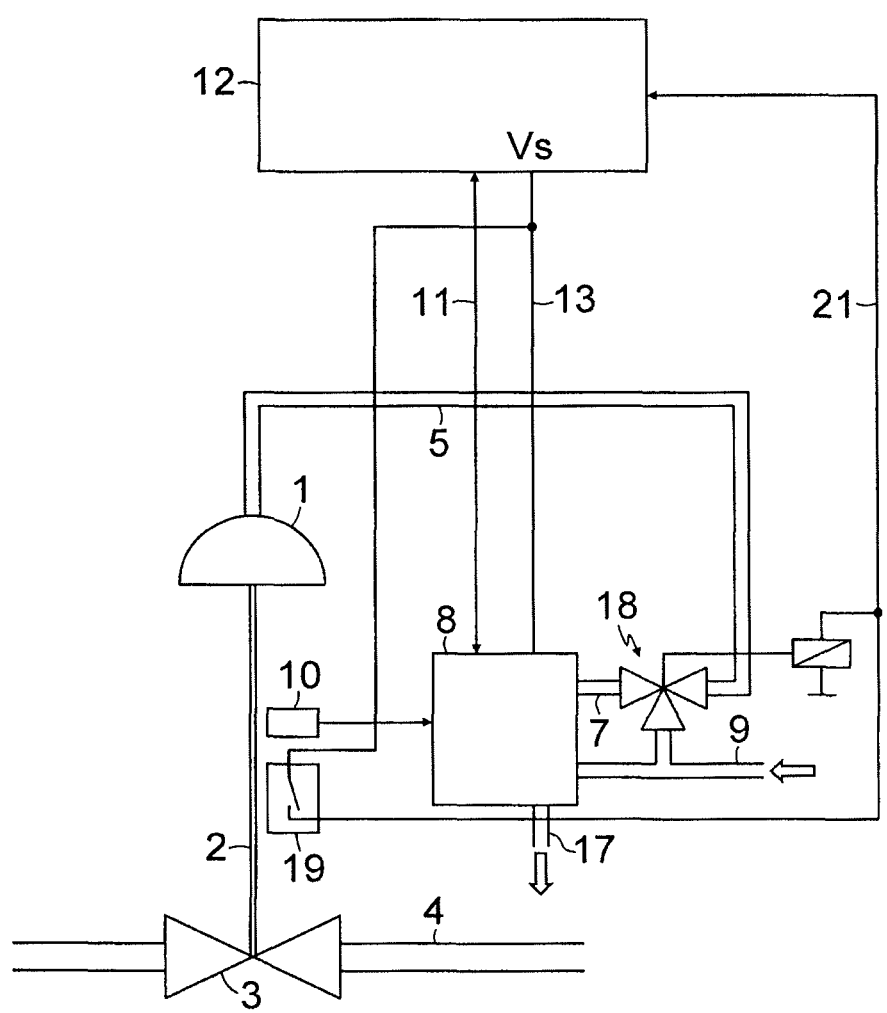
FIG. 3 shows a further exemplary embodiment of the actuator device, without a solenoid valve, in accordance with the invention, with identical or corresponding parts being provided with corresponding reference symbols.

FIG. 3 shows an actuator device that is similar to that in FIG. 1 but with the essential difference that the position controller 8 itself assumes the function of the solenoid valve 6 and, to this end, is connected to the supply voltage Vs on the power supply side and is configured to vent the pneumatic actuating drive 1 in the event of failure of the power supply. If the supply voltage Vs fails or is switched off, the position controller 8 vents the actuating drive 1 through its outlet 17, and therefore the valve 3 moves to the safety position. As long as the supply voltage Vs is applied to the position controller 8, the position controller 8 controls the valve position in accordance with a stored setpoint value which is a small amount, for example 3%, lower than the operating end position of the valve 3. As a result, control is continuously active, this reduces the risk of the output valves "sticking" in the pneumatic output stage of the position controller 8. A partial stroke test can selectively be initiated manually by an operator control element on the position controller 8, by a signal which is transmitted to the position controller 8 over the communication line 11, or at regular intervals by a timer that is contained in the position controller 8.

If the position controller 8 is vented because of a fault or a disturbance, even though the supply voltage Vs is applied and there is no emergency, the actuating element 2 moves out of its operating position until the position limit value switch 19 closes and connects the three-way solenoid valve 18 to the supply voltage Vs. The three-way solenoid valve 18 that is activated in this way switches the actuating drive 1 from the actuating pressure outlet 7 to the feed air 9, and therefore the actuating element 2 is moved back again. Therefore, the actuating element 2 performs an oscillating movement for the period for which the position controller 8 fails, where it is possible for the oscillating movement to be detected by the position controller 8, to the extent that the position controller 8 is still able to do this, and signaled to the control system 12 over the communication line 11. In the disclosed exemplary embodiment, the signal can be output by the switching activity of the limit value switch 19 being recorded by the electrical voltage across the valve arrangement 18 and being signaled to the control system 12 by a signaling line 21.

Thus, while there are shown, described and pointed out fundamental novel features of the invention as applied to preferred embodiments thereof, it will be understood that various omissions and substitutions and changes in the form and details of the illustrated method and apparatus, and in their operation, may be made by those skilled in the art without departing from the spirit of the invention. Moreover, it should be recognized that methods and structures shown and/or described in connection with any disclosed form or embodiment of the invention may be incorporated in any other disclosed or described or suggested form or embodiment as a general matter of design choice.

The invention claimed is:

1. An actuator device comprising:
   an open/close valve;
   an actuating element acting on the open/close valve;
   a pneumatic actuating drive configured to adjust the open/close valve using the actuating element acting on the open/close valve;
   a position sensor configured to record an actual position of the actuating element;
   an electropneumatic position controller supplied with compressed air from a feed air inlet, the electropneumatic position controller generating an actuating pressure at an actuating pressure outlet as a function of the actual position and a setpoint position;
   an activated solenoid valve configured to supply the actuating pressure to the actuating drive, the activated solenoid valve being supplied with a supply voltage to be activated, and the activated solenoid valve being deactivatable in an emergency by switching off the supply voltage to vent the actuating drive;
   at least one of a position limit value sensor, operable by the actuating element, and a pressure limit value sensor, configured to records the actuating pressure at the solenoid valve; and
   a controllable valve arrangement between the feed air inlet of the electropneumatic position controller and the activated solenoid valve;
   wherein the controllable valve arrangement is actuated by the at least one of the position limit value sensor and the pressure limit value sensor to connect the solenoid valve directly to the feed air when the position limit value sensor detects one of a pre-specified movement position of the actuating element has been reached and the pressure limit value sensor detects that a pre-specified minimum pressure has been undershot.

2. The actuator device as claimed in claim 1, wherein the pressure limit value sensor mechanically actuates the valve arrangement.

3. The actuator device as claimed in claim 1, wherein the position controller is configured to record an oscillatory movement of the actuating element caused by the controllable valve arrangement switching back and forth.

4. The actuator device as claimed in claim 1, wherein the controllable valve arrangement is electrically controllable and is connected to the supply voltage by a limit value sensor which comprises a limit value switch.

5. The actuator device as claimed in claim 4, further comprising an auxiliary circuit configured to record a switching activity of the limit value switch.

6. The actuator device as claimed in claim 1, wherein the controllable valve arrangement comprises a three-way valve situated between the feed air inlet, the actuating pressure outlet and the solenoid valve.

7. The actuator device as claimed in claim 6, wherein the valve arrangement is electrically controllable and is connected to the supply voltage by a limit value sensor which comprises a limit value switch.

8. The actuator device as claimed in claim 6, wherein the pressure limit value sensor mechanically actuates the valve arrangement.

9. An actuator device comprising:
an open/close valve;
an actuating element acting on the open/close valve;
a pneumatic actuating drive configured to adjust the open/close valve using the actuating element acting on the open/close valve;
a position sensor configured to record an actual position of the actuating element;
an electropneumatic position controller supplied with compressed air from a feed air inlet, the electropneumatic position controller generating an actuating pressure at an actuating pressure outlet as a function of the actual position and a setpoint position, the electropneumatic position controller being directly connected to the pneumatic actuating drive without an intermediate connection of a solenoid valve, connected at a power supply end to a supply voltage of a power supply and being configured to vent the actuating drive if the power supply fails;
at least one of a position limit value sensor operable by the actuating element and a pressure limit value sensor configured to record the actuating pressure at the solenoid valve;
a valve arrangement between a feed air inlet of the electropneumatic position controller and the actuating drive, the valve arrangement being electrically activateable, the valve arrangement connecting the actuating drive to an actuating pressure outlet in a passive state and connecting the actuating drive directly to the feed air in an active state, and being actuated by the at least one of the position limit value sensor and the pressure limit value sensor;
wherein the position and pressure limit value sensors each comprise a limit value switch which connect the valve arrangement to the supply voltage and which closes when one of the actuating element reaches a pre-specified movement position and the recorded actuating pressure falls below a pre-specified minimum pressure.

10. The actuator device as claimed in claim 9, further comprising an auxiliary circuit configured to record a switching activity of the limit value switch.

11. The actuator device as claimed in claim 9, wherein the position controller is configured to record an oscillatory movement of the actuating element caused by the controllable valve arrangement switching back and forth.

12. The actuator device as claimed in claim 9, wherein the controllable valve arrangement comprises a three-way valve situated between the feed air inlet, the actuating pressure outlet and the solenoid valve.

13. The actuator device as claimed in claim 12, further comprising an auxiliary circuit configured to record a switching activity of the limit value switch.

* * * * *